United States Patent
Manwill et al.

(10) Patent No.: US 6,260,379 B1
(45) Date of Patent: Jul. 17, 2001

(54) CONDENSER WITH INTEGRAL RECEIVER DRYER

(75) Inventors: Brett Lynn Manwill, Westland; Corey Homer, Royal Oak; Greg Whitlow, Whitmore Lake; John Joseph Meyer, Northville; Thaddeus J. Waskiewicz, Dearborn; William Meinyk, Lathrup Village, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/451,789

(22) Filed: Dec. 1, 1999

(51) Int. Cl.[7] .................................................. F25B 39/04
(52) U.S. Cl. .................. 62/509; 62/474; 62/475
(58) Field of Search .............................. 62/509, 498, 475, 62/474, 467, 85, 56

(56) References Cited

U.S. PATENT DOCUMENTS

| | | | |
|---|---|---|---|
| 3,064,819 | | 11/1962 | Jones . |
| 4,982,576 | * | 1/1991 | Proctor et al. ........................... 62/474 |
| 5,088,294 | * | 2/1992 | Ando ....................................... 62/509 |
| 5,146,767 | * | 9/1992 | Kadle et al. ............................ 62/474 |
| 5,159,821 | * | 11/1992 | Nakamura ................................ 62/509 |
| 5,394,710 | * | 3/1995 | Matsuo et al. .......................... 62/509 |
| 5,415,014 | * | 5/1995 | Waldschmidt et al. ................. 62/509 |
| 5,419,141 | * | 5/1995 | Burk ........................................ 62/474 |
| 5,709,106 | * | 1/1998 | Inaba et al. ............................. 62/509 |
| 5,813,249 | * | 9/1998 | Matsuo et al. .......................... 62/509 |
| 5,884,503 | * | 3/1999 | Inaba ...................................... 62/509 |
| 5,901,573 | * | 5/1999 | Kobayashi .............................. 62/509 |
| 5,992,174 | * | 11/1999 | Mittelstrass ............................ 62/474 |

FOREIGN PATENT DOCUMENTS

| | | |
|---|---|---|
| 198 43 031 A1 | 4/1999 | (DE) . |
| 0 709 644 A2 | 5/1996 | (EP) . |
| 2 735 856 | 12/1996 | (FR) . |
| 2 747 768 | 10/1997 | (FR) . |
| 2 777 638 | 10/1999 | (FR) . |
| WO 99/58908 | 11/1999 | (WO) . |

* cited by examiner

Primary Examiner—Teresa Walberg
Assistant Examiner—Fadi H. Dahbour
(74) Attorney, Agent, or Firm—Larry I. Shelton

(57) ABSTRACT

A condenser having an integral receiver dryer includes a first manifold, a second manifold, and a plurality of fluid carrying tubes extending between and in fluid communication with the first manifold and second manifold. The condenser also includes a receiver dryer being internal to and integral with a housing of one of the first manifold and the second manifold and including a dryer material disposed in the housing to dry fluid therein.

20 Claims, 7 Drawing Sheets

CONDENSER WITH INTEGRAL RECEIVER DRYER

BACKGROUND OF THE INVENTION

1. Field of the Invention

The present invention relates generally to air conditioning systems for motor vehicles and, more specifically, to a condenser with an integral receiver dryer for an air conditioning system in a motor vehicle.

2. Description of the Related Art

It is known to provide a condenser for an air conditioning system in a motor vehicle. The condenser typically receives a fluid such as a refrigerant in a vapor phase, at a reasonably high temperature, and cools the vapor phase to transform it to a liquid phase. The condenser normally includes a plurality of tubes extending between opposite headers. The condenser also includes a plurality of cooling fins disposed between the tubes. One type of condenser, often referred to as a multi-pass condenser, includes a plurality of baffles placed in one or both of the headers to direct the refrigerant through a plurality of flow paths. As the refrigerant flows in a back and forth pattern through the condenser, heat is transferred from the vapor phase of the refrigerant to condense to the liquid phase. The liquid phase continues to flow through the tubes of the condenser until it reaches an outlet where it is drawn off and used in the air conditioning system. When both liquid and vapor phases are present, continued flow of the liquid phase through the tubes decreases the overall efficiency of the condenser as the vapor phase is hindered from contacting and transferring heat to the tubes. Further, the liquid phase of the refrigerant occupies space within the tubes, thus reducing available interior surface area for heat transfer.

It is also known to provide a separate receiver dryer for storage of excess refrigerant from the condenser and to remove any moisture from the refrigerant in the air conditioning system. An example of a separate receiver dryer for a condenser in an air conditioning system is disclosed in U.S. Pat. No. 5,755,113. In this patent, a separate receiver dryer fluidly communicates with a condenser. The receiver dryer includes a fluid inlet for receiving a two-phase refrigerant mixture from the condenser and two outlets, both of which direct refrigerant back to the condenser after phase separation. The receiver dryer also includes a quantity of desiccant material to remove moisture from the two-phase refrigerant mixture.

Other examples of receiver dryers used with condensers are disclosed in U.S. Pat. Nos. 5,537,839, 5,546,761 and 5,666,791. However, these receiver dryers utilize separate containers, which are attached to the header or manifold of the condenser by various means. In some cases, the attached containers do not contain the desiccant material. Since the receiver dryer is a separate part, it requires additional space, fittings and brackets to attach it to the air conditioning system.

Although the above receiver dryers have worked well, it is desirable to incorporate a receiver dryer into a condenser. It is also desirable to incorporate a receiver dryer into a manifold of a condenser. It is further desirable to provide a condenser with a receiver dryer having fewer parts and compact installation.

SUMMARY OF THE INVENTION

Accordingly, the present invention is a condenser including a first manifold, a second manifold spaced from and opposing the first manifold, and a plurality of fluid carrying tubes extending between and in fluid communication with the first manifold and the second manifold. The condenser also includes a receiver dryer being internal to and integral with a housing of one of the first manifold and the second manifold and including a dryer material disposed in the housing to dry fluid therein.

One advantage of the present invention is that a condenser with an integral receiver dryer is provided for an air conditioning system of a motor vehicle. Another advantage of the present invention is that the condenser has the receiver dryer incorporated into a manifold of the condenser that has been increased in diameter. Yet another advantage of the present invention is that the condenser has an integral receiver dryer in the manifold which has fewer parts and compact installation. Still another advantage of the present invention is that the condenser has an integral receiver dryer including a large single manifold and dryer material that perform as a receiver dryer. A further advantage of the present invention is that the condenser has an integral receiver dryer that includes a deflector in the manifold to direct refrigerant to upper passes of the condenser. Yet a further advantage of the present invention is that the condenser has an integral receiver dryer with a two-piece integrated stamped manifold with multiple baffle depressions for flexible baffle locations as an option. Still a further advantage of the present invention is that the condenser has an integral receiver dryer with a modular capsule or desiccant bag for the dryer material. Another advantage of the present invention is that the condenser has an integral receiver dryer with some phase separation.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
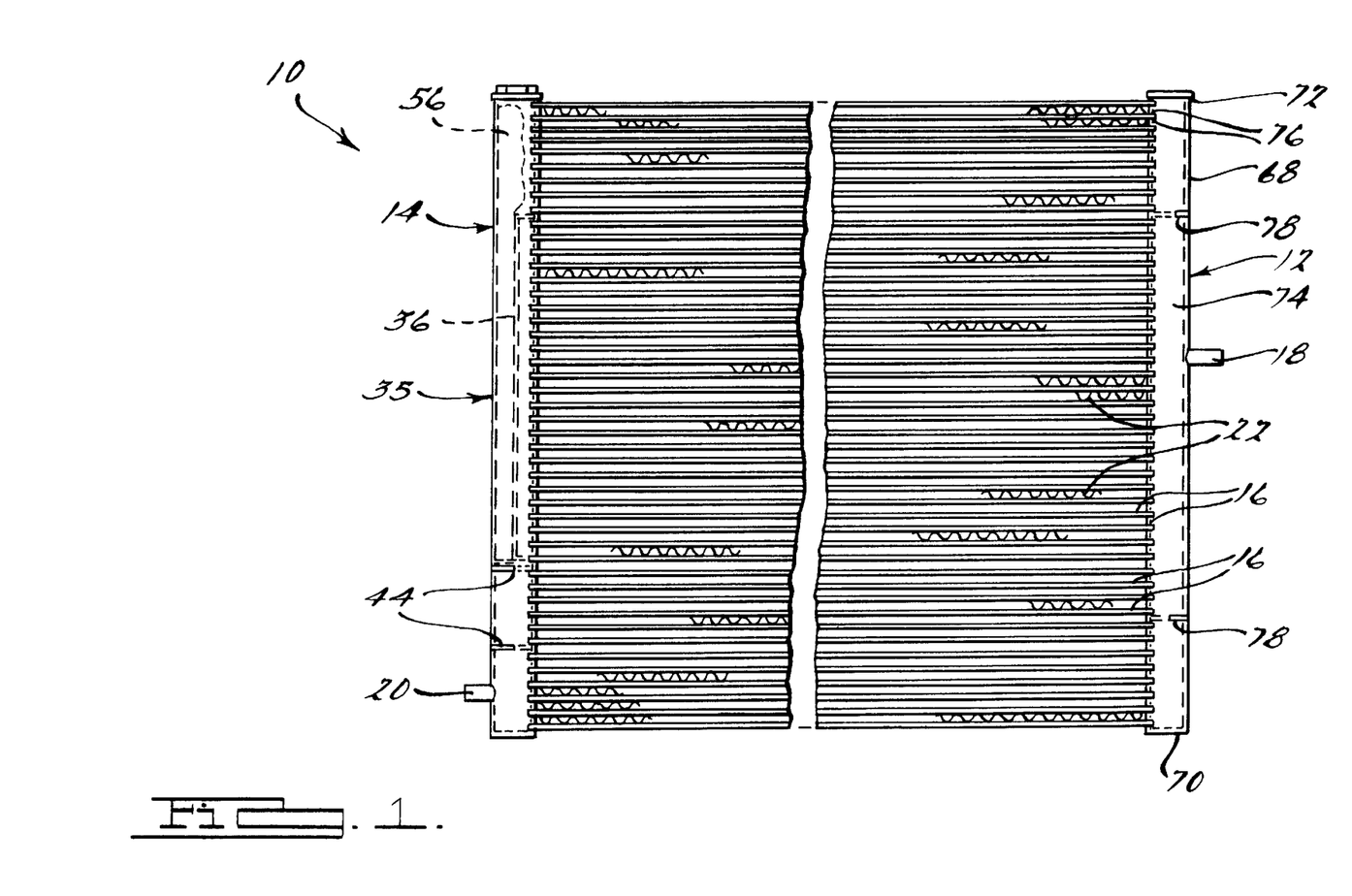
FIG. 1 is an elevational view of a condenser with an integral receiver dryer, according to the present invention.

Referring to the drawings and in particular FIG. 1, one embodiment of a condenser 10, according to the present invention, is shown for an air conditioning system (not shown) in a motor vehicle (not shown). The condenser 10 includes a pair of generally vertical, parallel manifolds, first or inlet manifold 12 and second or outlet manifold 14 spaced apart a predetermined distance. The condenser 10 also includes a plurality of generally parallel, flat tubes 16 extending between the manifolds 12,14 and conducting fluid such as a refrigerant between them. The condenser 10 includes a fluid inlet 18 for directing the fluid into the condenser 10 formed in the inlet manifold 12 and a fluid outlet 20 for directing the fluid out of the condenser 10 formed in the outlet manifold 14. The condenser 10 also includes a plurality of convoluted or serpentine fins 22 disposed between the tubes 16 and attached to an exterior of each of the tubes 16. The fins 22 serve as a means for conducting heat away from the tubes 16 while providing additional surface area for convective heat transfer by air flowing over the condenser 10. It should be appreciated that the condenser 10 could be used as a heat exchanger in other applications besides motor vehicles.

Referring to FIGS. 2 through 5, the outlet manifold 14 is generally cylindrical in shape with a generally circular cross-sectional shape. The outlet manifold 14 has a diameter greater than the inlet manifold 12. Preferably, the outlet manifold 14 has a diameter in a range of approximately one (1) to approximately two (2) inches. The outlet manifold 14 is made of a metal material such as aluminum. The outlet manifold 14 has a side 24 extending axially, a closed end 26 at a bottom thereof and an open end 28 at a top thereof to form an interior chamber 30. The open end 28 is threaded for a function to be described. The side 24 has a plurality of slots 32 extending therethrough and spaced axially to receive one end of the tubes 16. It should be appreciated that the tubes 16 are secured to the side 24 by suitable means such as brazing. It should also be appreciated that the closed end 26 may be formed as an open end that is threaded for a function to be described. It should further be appreciated that both ends 26 and 28 may be open and threaded for a function to be described.

The condenser 10 includes an integral receiver dryer, generally indicated at 35, disposed in and integral with the outlet manifold 14. The receiver dryer 35 includes a flow deflector 36 disposed in the interior chamber 30 of the outlet manifold 14 to direct fluid to the upper tubes 16 or passes of the condenser 10. The flow deflector 36 extends radially between and is secured to the side 24 by suitable means such as brazing to divide the interior chamber 30. The flow deflector 36 also extends axially and has a first or upper end 38 extending radially. The upper end 38 has a flange 39 extending axially and secured to the side 24 by suitable means such as brazing. The flow deflector 36 has a second or lower end 40 extending radially. The lower end 40 has a flange 42 extending axially and secured to the side 24 by suitable means such as brazing. The flow deflector 36 is made of a metal material such as aluminum. It should be appreciated that the flow deflector 36 is integral with the outlet manifold 14.

The receiver dryer 35 includes at least one, preferably a plurality of baffles 44 disposed in the interior chamber 30 of the outlet manifold 14 to direct fluid in and out of the outlet manifold 14. The baffles 44 are generally planar and circular in shape. The baffles 44 include a flange 46 extending axially and circumferentially along a portion thereof. One of the baffles 44 extends through a slot 48 in the side 24 that is located axially between the outlet 20 and the flow deflector 36 until the flange 46 abuts the side 24. Another one of the baffles 44 extends through a slot 50 in the side 24 that is located axially beneath and adjacent to the lower end 40 of the flow deflector 36. This baffle 44 has an aperture 52 extending therethrough and a filter 54 such as a screen disposed over the aperture 52 and secured to the baffle 44 by suitable means such as brazing. The filter 54 filters out any foreign particles in the fluid and prevents them from exiting through the outlet 20. The baffles 44 are secured to the side 24 of the outlet manifold 14 by suitable means such as brazing. The baffles 44 are made of a metal material such as aluminum. It should be appreciated that the baffles 44 are integral with the outlet manifold 14.

The receiver dryer 35 includes a dryer bag 56 disposed in the interior chamber 30 of the outlet manifold 14 to remove moisture from the fluid. The dryer bag 56 contains a quantity of dryer material 58 such as desiccant. It should be appreciated that the dryer bag 56 and dryer material 58 are conventional and known in the art.

The outlet manifold 14 also includes an end closure 60 for closing the open end 28 thereof. The end closure 60 has a head 62 extending radially and a threaded shaft 64 extending axially. The end closure 60 may include a seal 66 such as an O-ring disposed about the threaded shaft 64 and adjacent the head 62. The threaded shaft 64 engages the threaded open end 28 such that the seal 66 engages the side 24 and the head 62 overlaps the side 24. The end closure 60 is made of a metal material such as aluminum and the seal 66 is made of an elastomeric material such as rubber. It should be appreciated that the end closure 60 is removable to allow the dryer bag 56 to be replaced. It should also be appreciated that the dryer bag 56 is inserted into the outlet manifold 14 after the outlet manifold 14 is brazed and before the end closure 60 is in place.

Figure 2:
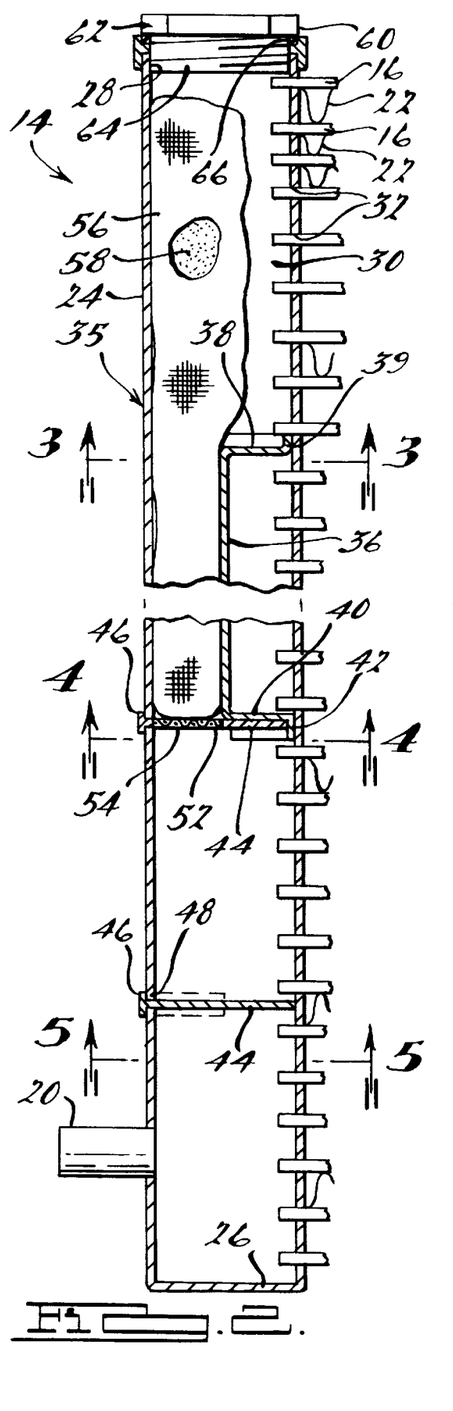
FIG. 2 is an enlarged fragmentary view of the condenser with integral receiver dryer of FIG. 1.
Figure 3:
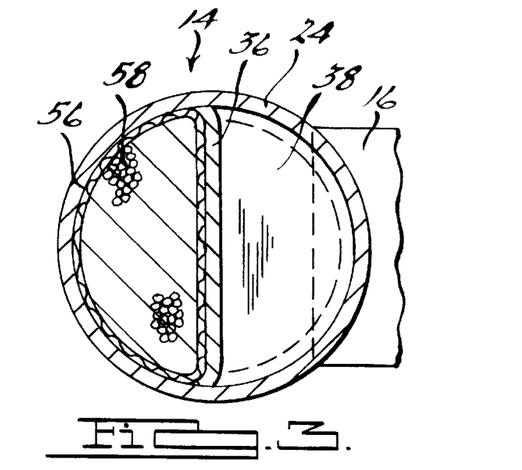
FIG. 3 is a sectional view taken along line 3—3 of FIG. 2.
Figure 4:
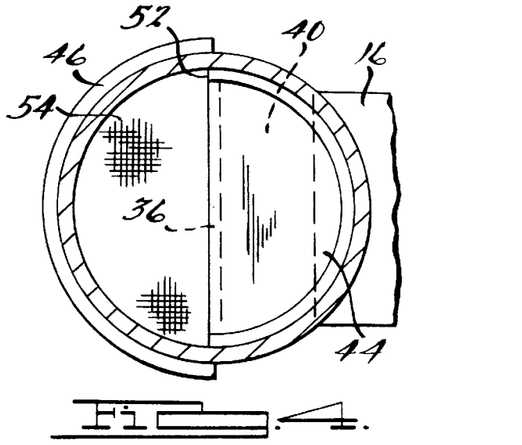
FIG. 4 is a sectional view taken along line 4—4 of FIG. 2.
Figure 5:
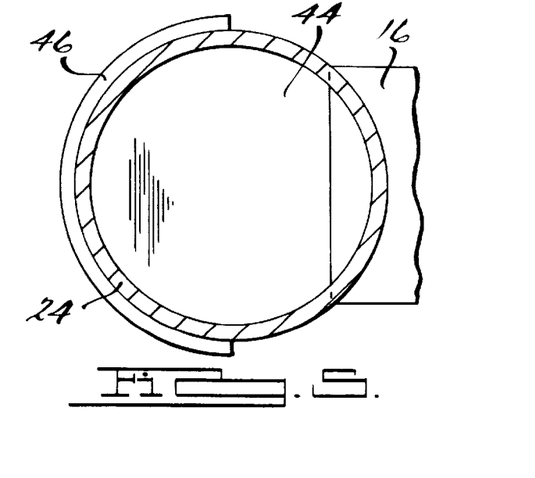
FIG. 5 is a sectional view taken along line 5—5 of FIG. 2.

The inlet manifold 12 is generally cylindrical in shape with a generally circular cross-sectional shape. The inlet manifold 12 is made of a metal material such as aluminum. The inlet manifold 12 has a side 68 extending axially, a closed end 70 at a bottom thereof and a closed end 72 at a top thereof to form an interior chamber 74. The side 68 has a plurality of slots 76 extending therethrough and spaced axially to receive one end of the tubes 16. The tubes 16 are secured to the side 68 by suitable means such as brazing.

The inlet manifold 12 includes at least one, preferably a plurality of baffles 78 disposed in the interior chamber 74 to direct fluid in and out of the inlet manifold 12. The baffles 78 are generally planar and circular in shape. The baffles 78 are spaced axially and located approximately across from the baffles 44 in the outlet manifold 14 and the upper end 38 of the flow deflector 36 to define predetermined passes or loops of the condenser 10. The baffles 78 are secured to the side 68 of the inlet manifold 12 by suitable means such as brazing. The baffles 78 are made of a metal material such as aluminum. It should be appreciated that the baffles 78 are integral with the inlet manifold 12.

In operation, fluid such as refrigerant from the air conditioning system enters the condenser 10 through the inlet 18 on the inlet manifold 12. The baffles 78 and flow deflector 36 direct or route the fluid through a first pass of fifteen (15) tubes 16 and a second pass of eleven (11) tubes 16 and into an upper pass of seven (7) tubes of the condenser 10. The fluid flow enters the outlet manifold 14 at the top. The condensed liquid fluid, being of a greater density, drops over the dryer bag 56 and to a lower portion of the outlet manifold 14, creating a liquid seal. The condensed liquid fluid passes through the screen 54 and enters a first pass of four (4) tubes 16 of a subcooling loop. The condensed liquid fluid reverses and passes through a second pass of four (4) tubes 16 of the subcooling loop, into the lower part of the outlet manifold 14 and through the outlet 20 and on to an evaporator (not shown) of the air conditioning system. It should be appreciated that the number of tubes 16 per pass or loop may be varied depending on the performance requirements of the condenser 10 desired.

Figures 6, 7, 8:
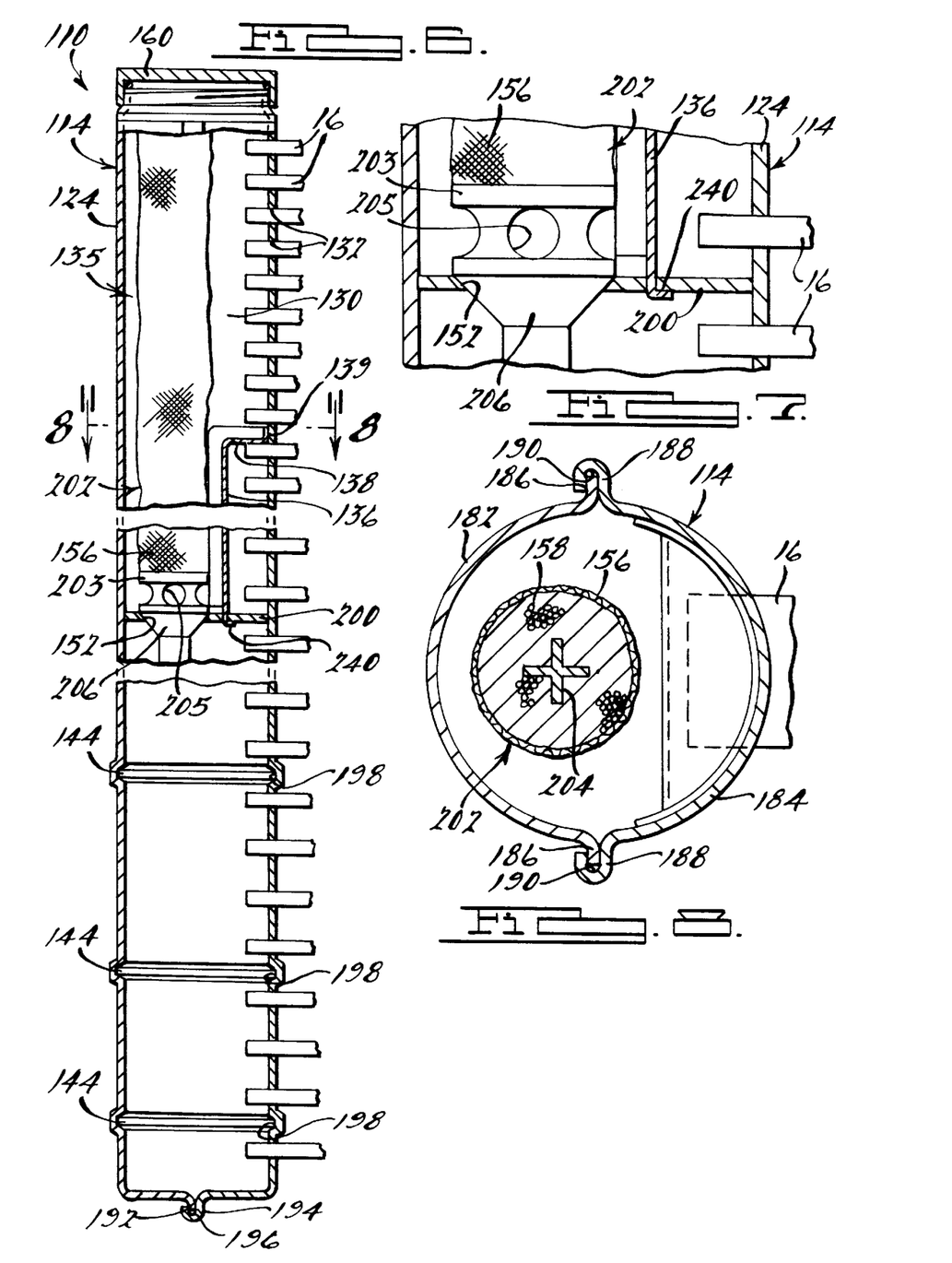
FIG. 6 is an enlarged fragmentary view of another embodiment, according to the present invention, of the condenser with integral receiver dryer of FIG. 1.
FIG. 7 is an enlarged view of a portion of the receiver dryer of FIG. 6.
FIG. 8 is a sectional view taken along line 8—8 of FIG. 6.

Referring to FIGS. 6 through 8, another embodiment 114, according to the present invention, is shown for the condenser 10. Like parts of the condenser 10 have like reference numerals increased by one hundred (100). In this embodiment, the outlet manifold 114 is a split manifold having a two-piece housing. The outlet manifold 114 includes a first half housing 182 and a second half housing 184. The first half housing 182 and second half housing 184 extend axially and circumferentially. The first half housing 182 has side flanges 186 extending radially from side edges thereof and the second half housing 184 has corresponding generally C-shaped side flanges 188 extending radially from side edges thereof and have a recess 190 for receiving the side flanges 186. The first half housing 182 has an end flange 192 extending axially from an end thereof and the second half housing 184 has a corresponding generally C-shaped end flange 194 extending radially from the end thereof and has a recess 196 for receiving the end flange 192. The first half housing 182 and second half housing 184 include at least one, preferably a plurality of baffle depressions or locating bumps 198 for the baffles 144. The baffle depressions 198 extend radially and circumferentially. The baffle depressions 198 can be placed between the slots 132 for the tubes 16 and provide the flexibility of positioning the baffles 144 anywhere required by the condenser 110. The first half housing 182 and second half housing 184 are formed as stampings from a metal material such as aluminum. It should be appreciated that the first half housing 182 and second half housing 184 allow for ease of manufacturing and installation of the flow deflector 136 and baffles 144. It should also be appreciated that the first half housing 182 and second half housing 184 are secured together by suitable means such as brazing.

The receiver dryer 135 includes the flow deflector 136. The flow deflector 136 also extends axially and has a first or upper end 138 extending radially. The upper end 138 has a flange 139 extending axially and secured to the second half housing 184 by suitable means such as brazing. The flow deflector 136 has a second or lower end 140 extending radially and a baffle 200 at the lower end 140. The flow deflector 136 extends through the baffle 200 and the lower end 140 abuts the baffle 200. The lower end 140 is secured to the baffle 200 by suitable means such as brazing. The baffle 200 is generally planar and circular in shape. The baffle 200 include has an aperture 152 extending therethrough for a function to be described. The baffle 200 is secured to the first half housing 182 and second half housing 184 by suitable means such as brazing. The flow deflector 136 is made of a metal material such as aluminum with cladding on one side thereof. It should be appreciated that the flow deflector 136 is integral with the outlet manifold 114.

The receiver dryer 135 also includes a capsule, generally indicated at 202, disposed in the interior chamber 130 of the outlet manifold 114. The capsule 202 is generally cylindrical in shape with a circular cross-section. The capsule 202 includes a base 203 that is generally circular in shape. The capsule 202 also includes a rod 204 extending axially from the base 203. The rod 204 has a generally cross or "+" sign cross-sectional shape. The capsule 202 includes the dryer bag 156 containing the dryer material 158 disposed about the rod 204. The capsule 202 has a plurality of apertures 205 extending radially through the base 203. The capsule 200 includes a seat portion 206 extending axially from the base 203 and having a general funnel shape. The capsule 200 is disposed in the interior chamber 130 such that the seat portion 206 extends into the aperture 152 of the baffle 200 and the end closure 160 abuts the end of the rod 204 of the capsule 202 to hold it in place. The rod 204, base 203 and seat portion 206 are made of a rigid material such as plastic and are integral, unitary and can be formed as one-piece.

During manufacture of the outlet manifold 114, the flow deflector 136 is installed into the second half housing 184 and secured for brazing. The baffles 144 are installed into the baffle depressions 198. The first half housing 182 is then clinched to the second half housing 184. After brazing the outlet manifold 114, the capsule 202 is disposed in the interior chamber 130 such that the seat portion 206 sits in the aperture 152 of the baffle 200 and the end closure 160 is installed.

Figure 9:
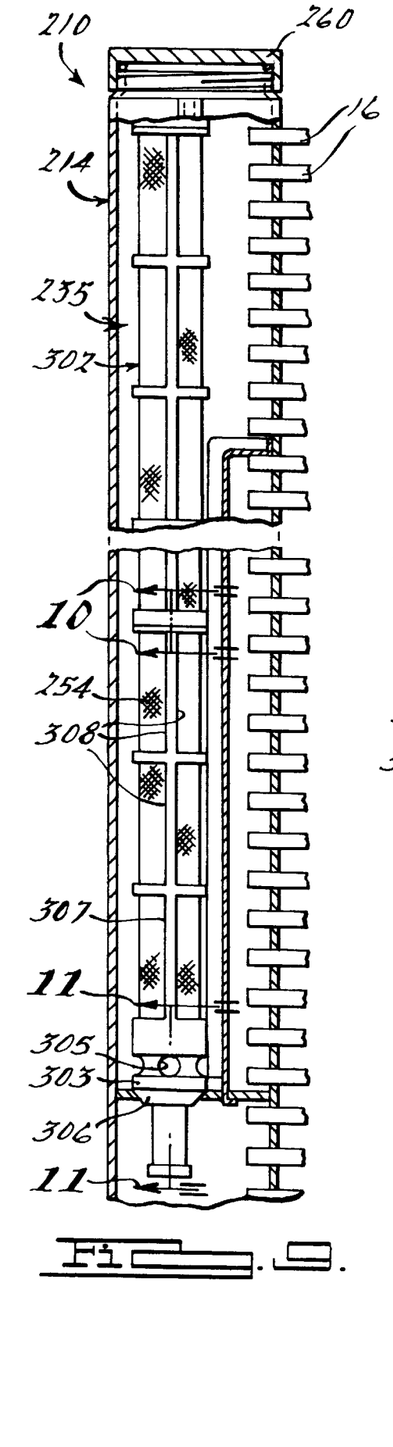
FIG. 9 is an enlarged fragmentary view of yet another embodiment, according to the present invention, of the condenser with integral receiver dryer of FIG. 1.
Figure 10:
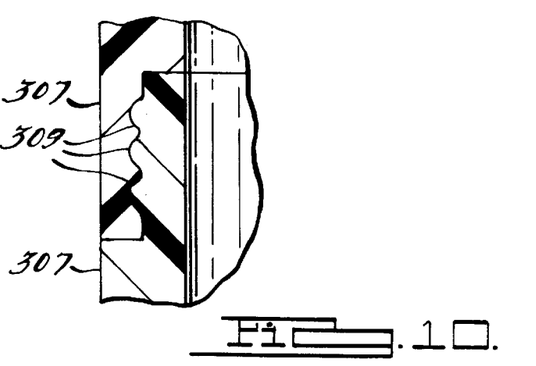
FIG. 10 is a sectional view taken along line 10—10 of FIG. 9.
Figure 11:
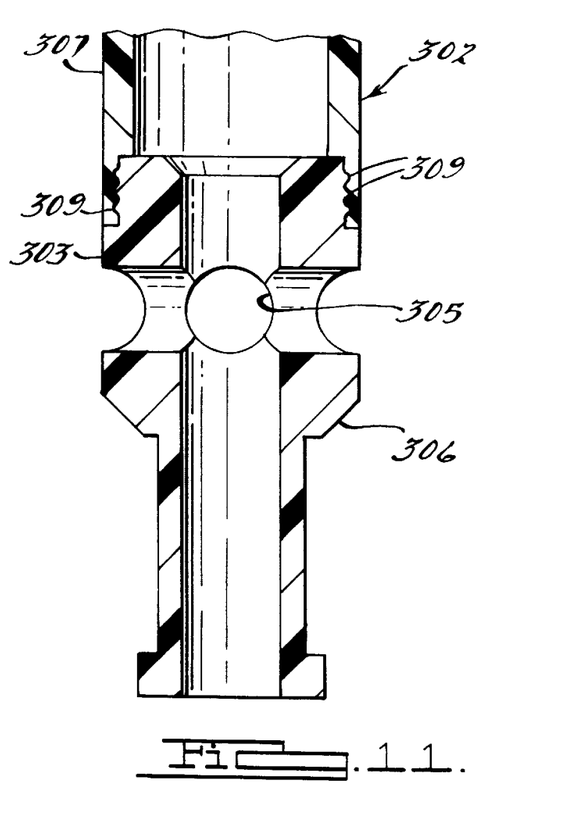
FIG. 11 is a sectional view taken along line 11—11 of FIG. 9.

Referring to FIGS. 9 through 11, yet another embodiment, according to the present invention, is shown for the condenser 10. Like parts of the condenser 10 have like reference numerals increased by two hundred (200). In this embodiment, the capsule 302 is modular to adjust the length of the capsule 302 to the outlet manifold 214. Instead of the rod, the capsule 302 has a housing 307 extending axially and being generally cylindrical in shape. The housing 307 has a plurality of apertures 308 extending radially therethrough and the filter 254 covering the apertures 308. The dryer material (not shown) is disposed in the housing 307 and is prevented from exiting the apertures 308 by the filter 254. Each end of the housing 307 has either internal or external threads 309 to allow the housing 307 to be threaded or snapped together to increase or decrease the length of the capsule 302. The capsule 302 has a cap (not shown) closing the end of the last housing 307. The cap may have a loop (not shown) attached thereto to allow a tool (not shown) to engage the loop to remove the capsule 302 from the outlet manifold 114. The loop also acts as a spring forcing the capsule 302 against the tapered seat when the cap is applied. The cap also allows dryer material to be replaced in the housing 307. The housing 307 is made of a rigid material such as plastic.

Figure 12:
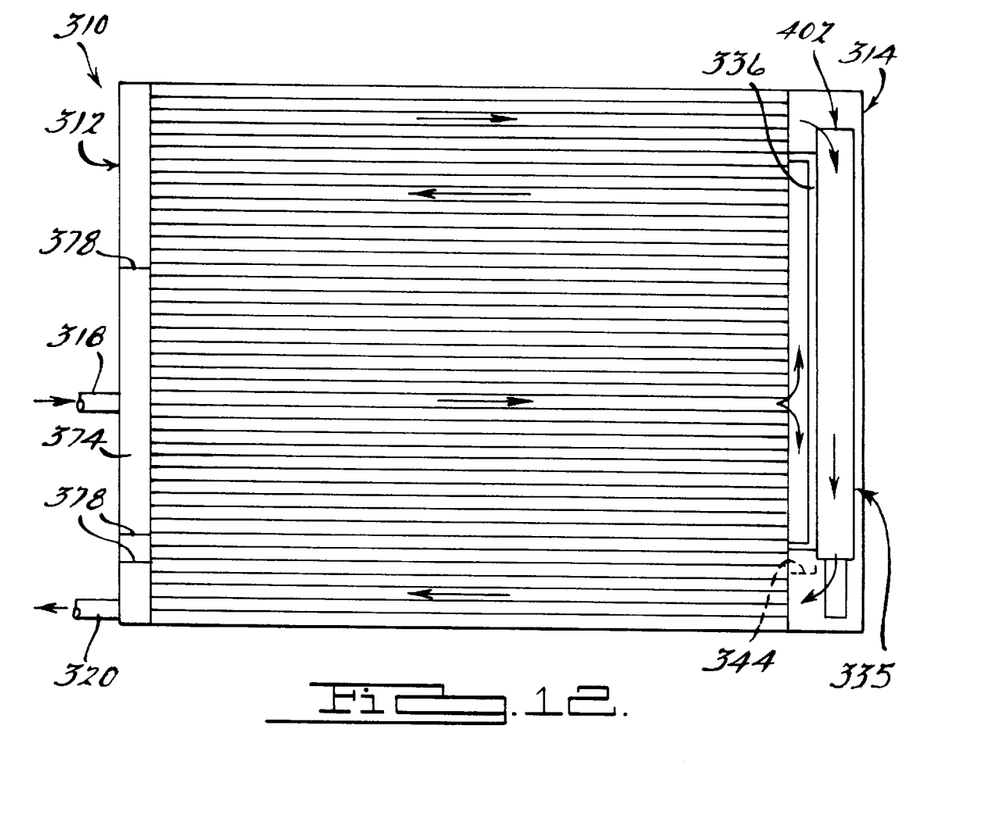
FIG. 12 is an elevational view of still another embodiment, according to the present invention, of the condenser with integral receiver dryer of FIG. 1.

Referring to FIG. 12, another embodiment, according to the present invention, of the condenser 10 is shown. Like parts of the condenser 10 have like reference numerals increased by three hundred (300). In this embodiment, the condenser 310 incorporates phase separation with the integrated receiver dryer 335. The condenser 310 has the inlet 318 and outlet 320 formed on the first manifold 312. The condenser 310 includes the receiver dryer 335 disposed in the second manifold 314. The receiver dryer 335 includes the flow deflector 336 and capsule 402. The second manifold 314 may include an optional baffle 344 which acts as a second inlet to the receiver dryer 335 to allow a liquid rich portion of the refrigerant to combine in the receiver dryer 335 and exit as a saturated or sub-cooled liquid into the final or sub-cooling loop. It should be appreciated that without the optional baffle 334 the liquid rich portion of the refrigerant bypasses the receiver dryer 335 and flows directly to the sub-cooling pass. It should also be appreciated that the inlet manifold 312 includes the baffles 378 to direct the flow.

In operation, the refrigerant enters the condenser 310 in a middle section of the first manifold 312. The refrigerant flows through a first section of the condenser 310 and is then separated into liquid and vapor phases in the interior chamber 330 of the second manifold 314. The vapor-rich refrigerant flows toward a top portion of the condenser 310 and the liquid-rich refrigerant flows toward a bottom portion of the condenser 310. At the top portion of the condenser 310, the vapor-rich refrigerant flows into the receiver dryer 335 of the second manifold 314. The liquid-rich refrigerant flows into the receiver dryer 335 of the second manifold 314. The liquid refrigerant exits the receiver dryer 335 near the bottom portion of the second manifold 314. The refrigerant then proceeds through the sub-cooling portion of the condenser 310 to exit the first manifold 312 through the outlet 320. It should be appreciated that the second manifold 314 also recombines phases after phase separation.

Figure 13:
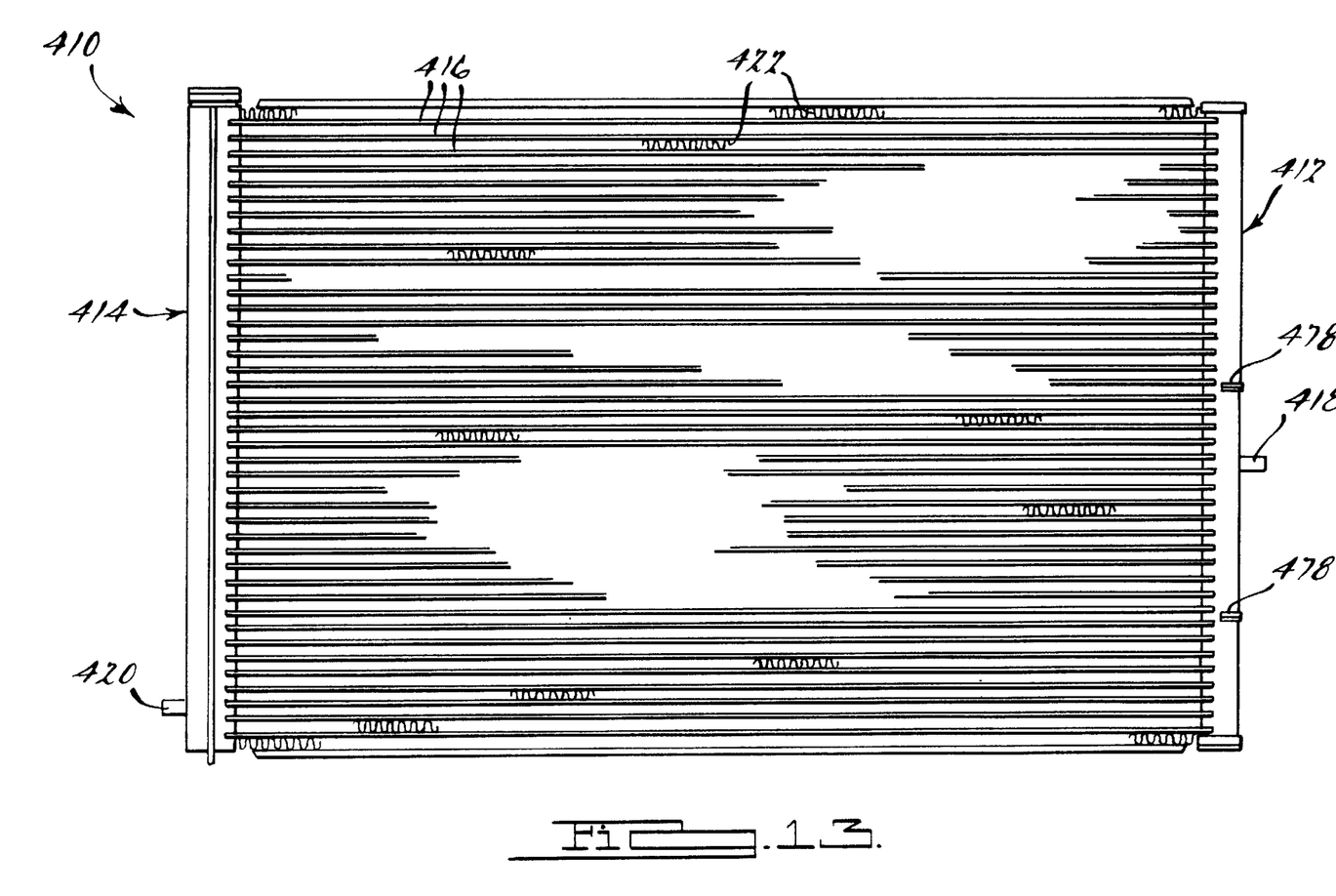
FIG. 13 is an elevational view of a further embodiment, according to the present invention, of the condenser with integral receiver dryer of FIG. 1.
Figures 14, 15, 16:
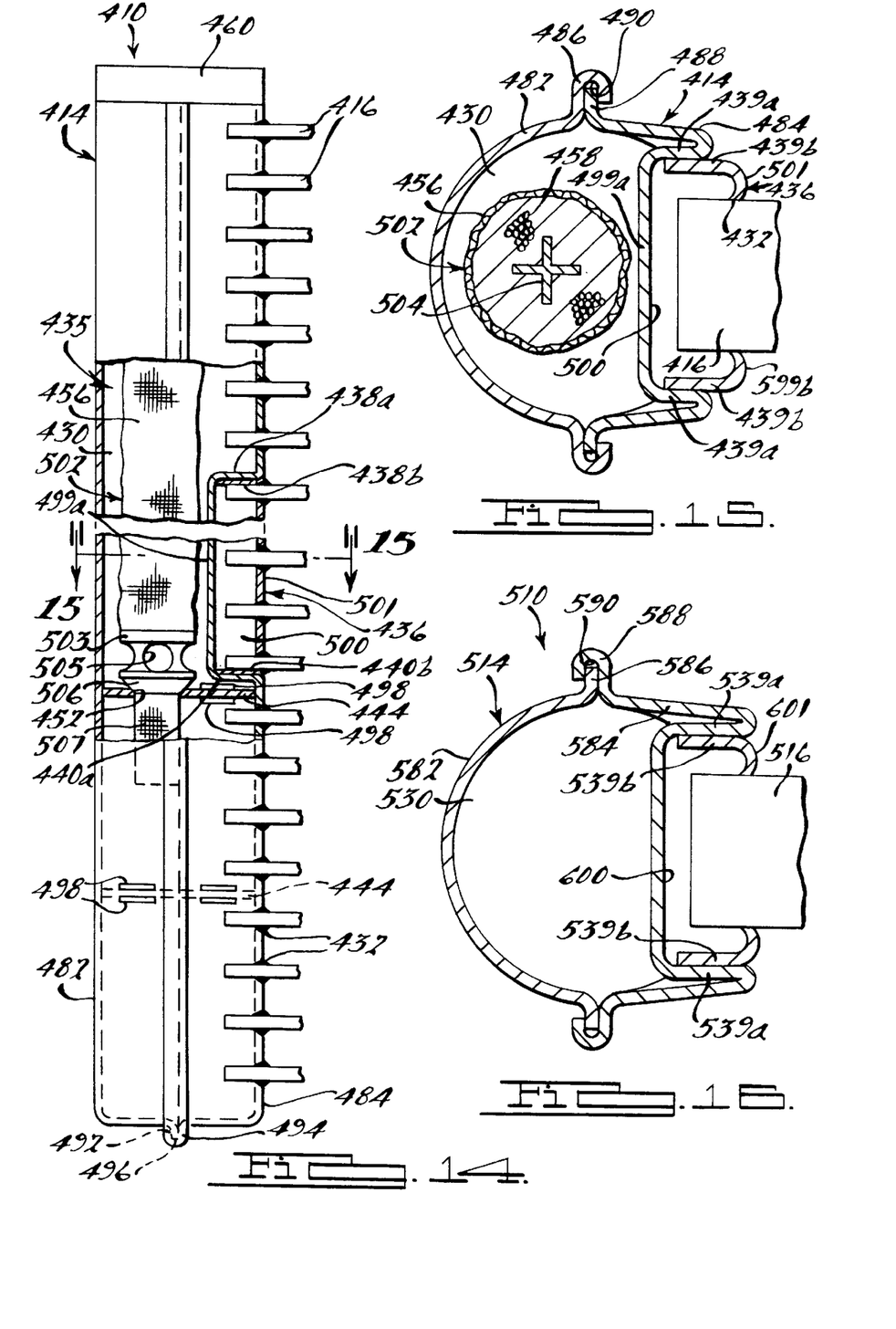
FIG. 14 is an enlarged fragmentary view of the condenser with integral receiver dryer of FIG. 13.
FIG. 15 is a sectional view taken along line 15—15 of FIG. 14.
FIG. 16 is a view similar to FIG. 15 of a yet further embodiment, according to the present invention, of the condenser with integral receiver dryer of FIG. 13.

Referring to FIGS. 13 through 15, yet another embodiment, according to the present invention, of the condenser 10 is shown. Like parts of the condenser 10 have like reference numerals increased by four hundred (400). In this embodiment illustrated in FIG. 13, the condenser 410 includes the inlet manifold 412 having the inlet 418 and the baffles 478 to direct flow. It should be appreciated that the inlet manifold 12 is similar to the inlet manifold 12.

The condenser 410 also includes the outlet manifold 414 having the outlet 420. The tubes 416 and fins 422 extend between the inlet manifold 412 and outlet manifold 414. It should be appreciated that, except for the outlet manifold 414, the condenser 410 is similar to the condenser 10.

As illustrated in FIGS. 14 and 15, the outlet manifold 414 includes the integral receiver dryer 435. In this embodiment, the outlet manifold 414 is a split manifold having a two-piece housing. The outlet manifold 414 includes a first half housing 482 and a second half housing 484. The first half housing 482 and second half housing 484 extend axially and circumferentially. The second half housing 484 has side flanges 488 extending radially from side edges thereof and the first half housing 484 has corresponding generally C-shaped side flanges 486 extending radially from side edges thereof and have a recess 490 for receiving the side flanges 488. The first half housing 482 has an end flange 492 extending axially from an end thereof and the second half housing 484 has a corresponding generally C-shaped end flange 494 extending radially from the end thereof and has a recess 496 for receiving the end flange 492. The first half housing 482 and second half housing 484 include at least one, preferably a plurality of baffle locating bumps or projections 498 for the baffles 444. The baffle locating projections 498 extend radially and circumferentially. The baffle locating projections 498 can be placed between the slots 432 for the tubes 416 and provide the flexibility of positioning the baffles 444 anywhere required by the condenser 410. The first half housing 482 and second half housing 484 are formed as stampings from a metal material such as aluminum. It should be appreciated that the first half housing 482 and second half housing 484 allow for ease of manufacturing and installation of the baffles 444. It should also be appreciated that the first half housing 482 and second half housing 484 are secured together by suitable means such as brazing.

The receiver dryer 435 includes a flow deflector, generally indicated at 436. The flow deflector 436 includes the second half housing 484 having a first or upper end 438a extending radially inwardly and a second or lower end 440a extending radially inwardly and spaced axially from the upper end 438a. The second half housing 484 has a pair of sides 439a spaced radially and extending axially between the upper end 438a and lower end 440a. The second half housing 484 also has a back 499a extending between the upper and lower ends 438a and 440a and sides 439a to form a cavity or pocket 500. The flow deflector 436 also includes an insert 501 cooperating with the pocket 500. The insert 501 has a first or upper end 438b extending radially inwardly and a second or lower end 440b extending radially inwardly and spaced axially from the upper end 438b. The insert 501 has a pair of sides 439b spaced radially and extending axially between the upper end 438b and lower end 440b. The insert 501 also has a front 499b extending between the upper and lower ends 438b and 440b and sides 439b. The front 499b has a plurality of the slots 432 for the tubes 416. The insert 501 is partially disposed in the pocket 500 such that the end of the sides 439a terminate short of the sides 439b as illustrated in FIG. 15. The sides 439a and 439b and upper ends 439a and 439b and lower ends 440a and 440b are secured together by suitable means such as brazing. The insert 501 is made of a metal material such as aluminum with cladding on one side thereof and formed as a stamping. It should be appreciated that the second half housing 484 is formed as a monolithic structure being integral, unitary and one piece and the insert 501 is integral with the second half housing 484.

The receiver dryer 135 also includes a capsule, generally indicated at 502, disposed in the interior chamber 430 of the outlet manifold 414. The capsule 502 is generally cylindrical in shape with a circular cross-section. The capsule 502 includes a base 503 that is generally circular in shape. The capsule 502 also includes a rod 504 extending axially from the base 503. The rod 504 has a generally cross or "+" sign cross-sectional shape. The capsule 502 includes the dryer bag 456 containing the dryer material 458 disposed about the rod 504. The capsule 502 has a plurality of apertures 505 extending radially through the base 503. The capsule 502 includes a seat portion 506 extending axially from the base 503 and having a general funnel shape. The capsule 502 includes a filter 507 extending axially from the seat portion 506 and being generally cylindrical in shape. The filter 507 is a screen to filter out any foreign particles in the refrigerant. The capsule 502 is disposed in the interior chamber 430 such that the seat portion 506 extends into the aperture 452 of the baffle 444 and the end closure 460 abuts the end of the rod 504 of the capsule 502 to hold it in place. The rod 504, base 503 and seat portion 506 are made of a rigid material such as plastic and are integral, unitary and can be formed as one-piece. It should be appreciated that the refrigerant flows out through the filter 507, but that the filter 507 may be constructed such that the refrigerant flows in through the filter 507. It should also be appreciated that, after brazing the outlet manifold 414, the capsule 502 is disposed in the interior chamber 430 such that the seat portion 406 sits in the aperture 452 of the baffle 444 and the end closure 460 is installed.

Referring to FIG. 16, still another embodiment, according to the present invention, of the condenser 10 is shown. Like parts of the condenser 10 have like reference numerals increased by five hundred (500). As illustrated in FIG. 16, the outlet manifold 514 includes the integral receiver dryer 535. In this embodiment, the outlet manifold 514 is a split manifold having a three-piece housing. The outlet manifold 514 includes a first half housing 582 and a second half housing 584. The first half housing 582 and second half housing 584 extend axially and circumferentially. The first half housing 582 has side flanges 586 extending radially from side edges thereof and the second half housing 584 has corresponding generally C-shaped side flanges 588 extending radially from side edges thereof and have a recess 590 for receiving the side flanges 586. The first half housing 582 and second half housing 584 are formed as stampings from a metal material such as aluminum. It should be appreciated that the first half housing 582 and second half housing 584 are similar to the first half housing 482 and second half housing 584 and are secured together by suitable means such as brazing.

The receiver dryer 535 includes a flow deflector, generally indicated at 536, which is similar to the flow deflector 436. The flow deflector 536 includes the second half housing 584 and insert 601. In this embodiment, the insert 601 is disposed in the pocket 600 such that the end of the sides 539a terminate at approximately the same place of the sides 539b as illustrated in FIG. 16. The insert 601 and second half housing 584 are secured together by suitable means such as brazing. It should be appreciated that the capsule (not shown) is inserted into the interior chamber 530.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A condenser comprising:

a first manifold;

a second manifold spaced from and opposing said first manifold;

a plurality of fluid carrying tubes extending between and in fluid communication with said first manifold and said second manifold; and a receiver dryer being internal to and integral with a housing of one of said first manifold and said second manifold and including a dryer material disposed in said housing to dry fluid therein.

2. A condenser as set forth in claim 1 wherein said receiver dryer includes a plurality of baffles positioned within the one of said first manifold and said second manifold and cooperating with said tubes to form a plurality of fluid flow passes, each flow pass having a plurality of said tubes associated therewith.

3. A condenser as set forth in claim 2 wherein said housing includes means for locating said baffles.

4. A condenser as set forth in claim 2 wherein said first manifold has a fluid inlet and said second manifold has a fluid outlet, said receiver dryer being disposed in said second manifold.

5. A condenser as set forth in claim 1 wherein said receiver dryer includes a flow deflector cooperating with the one of said first manifold and said second manifold.

6. A condenser as set forth in claim 1 wherein said flow deflector comprises pocket formed in said housing and an insert disposed in said pocket and receiving one end of said tubes.

7. A condenser as set forth in claim 1 including a filter disposed in the one of said first manifold and said second manifold before a fluid outlet thereof.

8. A condenser as set forth in claim 1 wherein the one of said first manifold and said second manifold comprises a plurality of housings.

9. A condenser as set forth in claim 3 wherein said housings are stampings.

10. A condenser as set forth in claim 1 including a capsule and said dryer material being operatively associated with said capsule.

11. A condenser as set forth in claim 10 wherein said capsule comprises a plurality of housing sections to be connected to each other to increase or decrease a length of said capsule.

12. A condenser as set forth in claim 1 wherein the one of said first manifold and said second manifold has a diameter greater than the other.

13. A condenser as set forth in claim 1 wherein said first manifold has a fluid inlet and a fluid outlet and said receiver dryer being disposed in said second manifold.

14. A condenser as set forth in claim 1 wherein said receiver dryer comprises a flow deflector disposed in the one of said first and second manifolds and a desiccant material disposed adjacent said flow deflector.

15. A condenser as set forth in claim 14 including a dryer bag for containing said desiccant material.

16. A condenser for an air conditioning system of a motor vehicle comprising:

an inlet manifold;

an outlet manifold spaced from and opposing said inlet manifold;

a plurality of fluid carrying tubes extending between and in fluid communication with said inlet manifold and said outlet manifold; and said outlet manifold having a housing with a diameter greater than said inlet manifold to act as a receiver and including a dryer material disposed therein to act as a dryer to dry fluid therein.

17. A condenser as set forth in claim 16 including a flow deflector disposed in said outlet manifold and said dryer material being disposed adjacent said flow deflector.

18. A condenser as set forth in claim 16 including a capsule for containing said dryer material.

19. A condenser as set forth in claim 16 wherein said outlet manifold comprises a first half housing and a second half housing being stamped and connected to each other.

20. A condenser as set forth in claim 16 including a filter disposed in said outlet manifold.

* * * * *